United States Patent [19]
Gottlieb

[11] Patent Number: 4,556,298
[45] Date of Patent: Dec. 3, 1985

[54] NON-FOGGING BATHROOM MIRROR
[76] Inventor: Robert G. Gottlieb, 15803 Mill Point, Houston, Tex. 77059
[21] Appl. No.: 630,823
[22] Filed: Jul. 13, 1984
[51] Int. Cl.[4] ............................. G02B 5/08; G02B 7/18
[52] U.S. Cl. ........................................... 350/588; 4/605
[58] Field of Search ...................... 350/588, 582, 610; 4/605

[56] References Cited
U.S. PATENT DOCUMENTS

| | | | |
|---|---|---|---|
| 2,171,662 | 9/1939 | Marchand | 219/39 |
| 2,617,701 | 11/1952 | Fennell | 312/227 |
| 2,815,433 | 12/1957 | Zumwalt | 219/45 |
| 3,135,004 | 6/1964 | Naigraw | 15/250.01 |
| 3,530,275 | 9/1970 | Rust | 219/219 |
| 3,594,063 | 7/1971 | Smillie | 350/588 |
| 3,708,218 | 1/1973 | Smillie | 350/588 |
| 4,076,374 | 2/1978 | Schwab | 350/588 |
| 4,150,869 | 4/1979 | Hansen | 350/588 |

Primary Examiner—Jon W. Henry
Attorney, Agent, or Firm—Arvid V. Zuber

[57] ABSTRACT

This invention is for a non-fogging mirror. Heated water flowing through a pipe section such as a shower arm is used to prevent fogging; the pipe section has an outlet and an inlet located in its surface. Means located within the pipe section induce the flow of water into the outlet or the inlet or both. The outlet and the inlet are connected to a conduit which is joined in heat-conducting relationship to the back of a reflecting surface.

13 Claims, 6 Drawing Figures

NON-FOGGING BATHROOM MIRROR

This invention relates to a non-fogging bathroom mirror.

More particularly it relates to non-fogging bathroom mirror which utilizes the flow of heated water diverted from bathroom pipes to prevent condensate from covering the reflective surfaces of a mirror.

The desirability of a non-fogging mirror for bathroom use has long been recognized. Fennell, U.S. Pat. No. 2,617,701 proposed to use a blower to direct a stream of air over the surface of a bathroom mirror. Zumwalt, U.S. Pat. No. 2,815,433 shows a mirror heated by an electric bulb within a mirror casing. Rust, U.S. Pat. No. 3,530,275 shows an electrically heated mirror wherein the heating element is activated by a thermal switch located on a shower pipe. Naigraw, U.S. Pat. No. 3,135,004 in dealing with deicing of external rear vision mirrors has proposed the use of a heated circulating fluid in conjunction with other means such as chemical deicers as defroster spray fluid to prevent icing of a rear vision mirror.

In distinction to these methods I have now found, and surprisingly so in view of the extreme methods previously utilized, that the relatively modest heating supplied by diversion of the flow of heated water through bathroom piping suffices to prevent fogging of bathroom mirrors even in the extreme humidity generated in a shower enclosure. Moreover, this result is obtained without any circulating system or loss of heated water.

This surprising result is obtained with a non-fogging mirror unit which utilizes the flow of heated water through bathroom pipes to prevent fogging of a mirror. The pipe section through which heated water flows has an outlet and an inlet. Means located within said pipe section for inducing the flow of water into the outlet cause water to be diverted into the outlet. Likewise, means located within said pipe section for inducing the flow of water into the inlet causes water to flow into the inlet. Either or both of these means inducing the flow of heated water can be used to cause the heated water to flow thru a conduit connecting the outlet and the inlet. This conduit is joined in heat-conducting relationship to the back of a reflecting surface. Heated water diverted from its flow through the pipe section flows through the conduit and is returned to the pipe section.

Therefore, it is an object of this invention to provide a non-fogging bathroom mirror.

It is a further object of this invention to provide an energy efficient non-fogging bathroom mirror which relies upon diversion from and return of heated water to its intended use to heat the mirror.

It is still a further object of this invention to provide a non-fogging mirror for use in shower enclosures which is readily installed and requires no expensive modifications to existing plumbing.

DESCRIPTION OF THE INVENTION

The present invention relates to a non-fogging bathroom mirror structure comprised of a section of pipe through which heated water flows, said pipe section having an outlet and an inlet located on the surface of said pipe section; means for inducing flow of water through said pipe section into said outlet; means for inducing the flow of water into said inlet; a conduit with one end connected to said outlet and the other end connected to said inlet; and a reflecting surface with the back of said reflecting surface being joined in heat-conducting relationship to said reflecting surface.

Either one of the means inducing the flow of water may be omitted. In such cases where one of the means inducing flow of water is omitted the outlet or the inlet, as the case may be, is replaced by a conventional connection to provide for flow of water. However, for maximum flow of water and, concurrently, of heat transfer it is preferred that both the outlet and the inlet be supplied with the means for inducing the flow of water described above.

Figure 1:
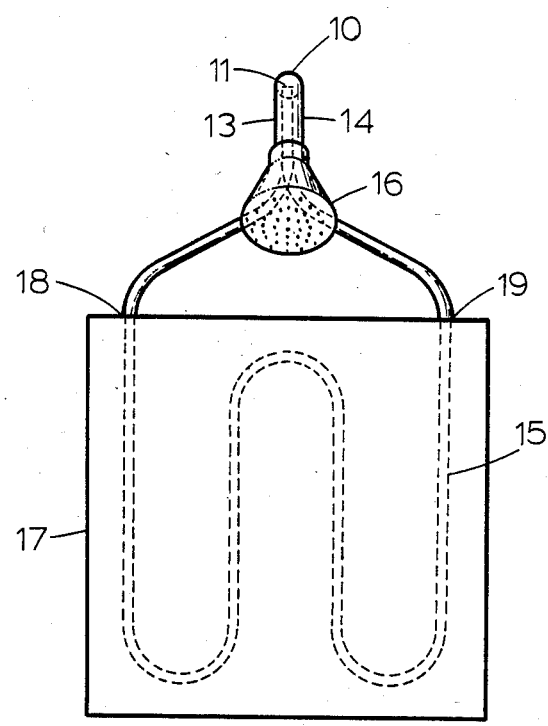
FIG. 1 is a frontal view of a non-fogging bathroom mirror where the pipe is that portion of the bathroom piping known as a shower arm and the conduit is a continuous tube.
Figure 2:
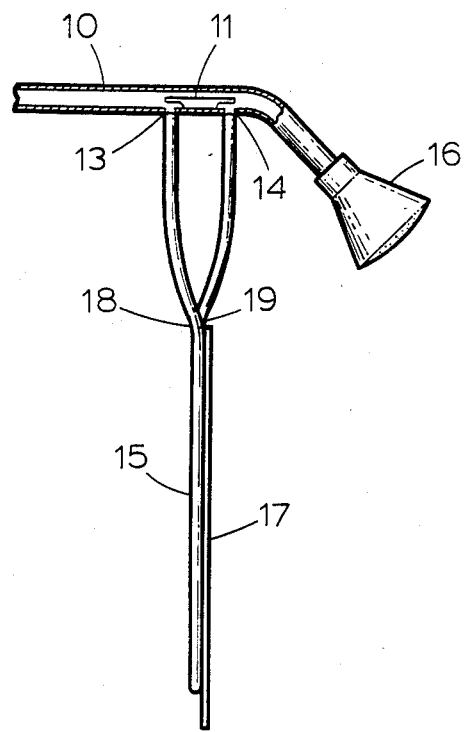
FIG. 2 is a side view of FIG. 1.

FIG. 1 and FIG. 2 illustrate an embodiment of the invention where the pipe which provides the flow of heated water is the shower arm. A shower head, 16, is shown affixed to the shower arm, 10. FIG. 2 is a side view of FIG. 1. The outlet in the pipe is, 13, the inlet is, 14, and the ends of conduit, 15, are connected to the outlet, 13, and the inlet, 14. The means, 11, inducing the flow of water for both the outlet and the inlet are provided by a Tee-shaped member between the outlet and the inlet with one arm of the Tee protruding over the inlet and the other over the outlet. The conduit, 15, of FIG. 1 and FIG. 2 may be made of copper tubing soldered or brazed to a reflecting metal surface, 17, which may be a metal such as chromium applied to a metal plate. As will be readily understood, it is not necessary to limit the pipe section which provides the flow of heated water to that portion of pipe known as the shower arm and any section of pipe through which heated water flows can be utilized. However, the shower arm is both readily accessible and readily replaced, is located in the bathroom area where a mirror is most susceptible to fogging and in an area where a useful shaving mirror is desired by many; for this reason this is a preferred embodiment.

The conduit may easily be connected by conventional means to a shower arm provided with the described and outlet and inlet when the conduit is copper tubing. Alternatively, the outlet and the inlet may be fitted with threaded connectors to which the ends of the copper conduit may be connected with conventional compression fittings for joining copper tubing. Furthermore, the conduit may terminate at the points indicated at, 18, and, 19, in FIGS. 1 and 2 and be connected by tubing to outlet, 13, and inlet, 14, by means such as those described for connecting copper tubing.

Alternatively, the connection between the outlet and the conduit and the inlet and the conduit may be comprised of an inner tube contained within an outer tube, said inner tube having a smaller cross-sectional area than the interior cross-sectional area of the outer tube, with one tube forming a connection between the outlet and the conduit and the other tube forming a connection between the inlet and the conduit.

Figure 3:
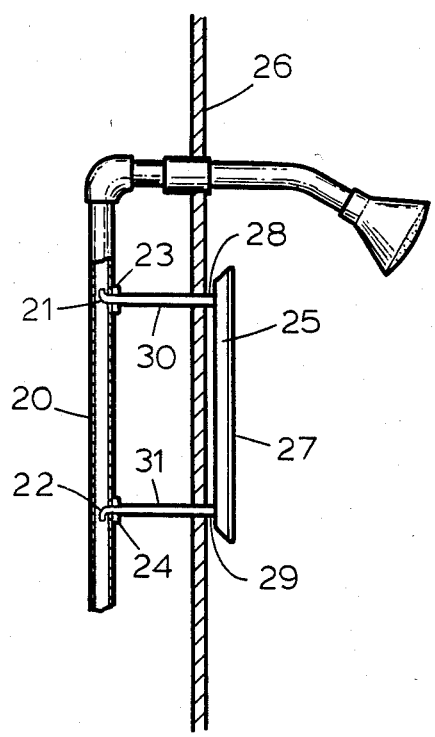
FIG. 3 is a cross-sectional view of a non-fogging mirror structure wherein the pipe is the vertical pipe supplying water to the shower, the conduit is a cavity substantially coextensive with the reflecting surface and with the cavity and mirror mounted on the shower wall.

FIG. 3 illustrates an embodiment of the invention wherein the conduit, 25, is a cavity essentially coextensive with the reflecting surface, 27, with open ends, 28, and 29, on opposite ends of the cavity. In FIG. 3, 20 is the vertical pipe through which water is delivered to the shower. The ends of the conduit, 28, and 29, are connected to outlet, 23, and inlet 24, on the pipe by lengths of tubing, 30, and 31, through the shower wall, 26. As previously described, these connections may be made by conventional means. In FIG. 3, the means inducing flow of water are provided by an ell. In this embodiment the ell at the outlet faces upstream with the orifice of the ell facing the flow of water and the ell at the inlet faces downstream with respect to the flow of water. The ells each have an exterior diameter less than the interior diameter of the pipe section. It will be understood that it is not necessary that the ells be 90° ells. Greater or lesser angles are permissible.

The open ends of the conduit when the conduit is a cavity essentially coextensive with the reflecting surface may be positioned in any arrangement which permits free flow through the cavity. Also, where the conduit is a cavity essentially coextensive with the reflecting surface the mirror face and cavity may be a unitary construction molded of plastic such as high density polypropylene, polyethylene, polycarbonate or the like with the reflecting surface being applied as a metallized film to the face of the cavity or formed directly on the face of the cavity by metallizing the surface. Where the conduit is essentially coextensive with the cavity surface, the openings in the conduit may embody all or a portion of the means necessary to make connections with the orifices in the pipe.

Figure 4:
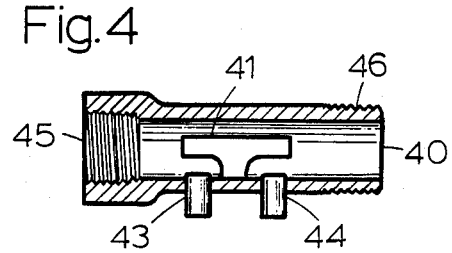
FIG. 4 shows a portion of a mirror structure wherein the pipe section is a section of pipe threaded both for attachment to the end of a shower arm and for attachment of a shower head, and the means inducing flow of water out of the outlet and the means inducing the flow of water into the inlet are provided by a Tee-block.

FIG. 4 illustrates an especially preferred embodiment of the invention wherein the pipe section, 40, is a section equipped with a female thread, 45, for attachment to a shower arm, with a male thread, 46, for attachment of a shower head, with outlet, 43, and with inlet, 44; in FIG. 4, the Tee-block, 41, induces the flow of water for both outlet and inlet.

Figure 5:
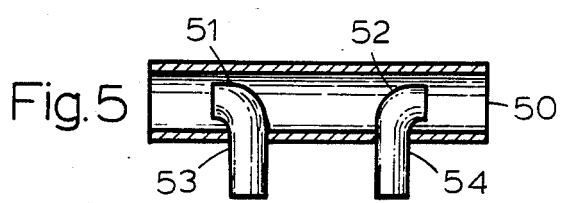
FIG. 5 shows a portion of a mirror structure where the means inducing flow are the back portion of an open elbow.

FIG. 5 is a further illustration of the use of ells as means for inducing the flow of water for the outlet and the inlet. In FIG. 5 the ells 51 and 52 within the pipe section, 50, terminate in outlet 53, and inlet 54.

Figure 6:
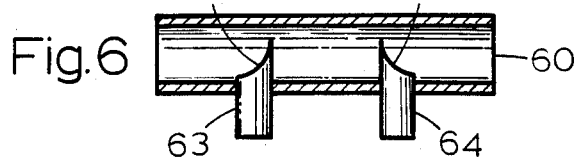
FIG. 6 shows a portion of a mirror structure where the means inducing flow are formed by a portion of the tubing comprising the inlet and the outlet.

FIG. 6 illustrates another embodiment of the invention where the means for inducing the flow of water are supplied by the arc formed by cutting away a portion of a tube forming the inlet or outlet leaving the arc projecting into the pipe section to induce the flow. The arc, 61, in the outlet, 63, induces flow from the outlet and the arc, 62, on the inlet 64, induces flow into the inlet.

It is to be understood that the foregoing description of the specific embodiments of the invention are illustrative only and are not intended to limit the scope of the invention and ambit of the claims inasmuch as additional embodiments within the intended scope of the invention will be readily apparent to those skilled in the art.

What is claimed is:

1. A non-fogging mirror structure comprised of:
   a section of pipe through which heated water flows, said section of pipe having an outlet and an inlet on its surface, means located within said pipe section for inducing the flow of water into said outlet,
   a conduit with one end of said conduit connected to said outlet and the other end of said conduit connected to said inlet,
   a reflecting surface with its back joined in heat-conducting relationship to said conduit.

2. A non-fogging mirror structure comprised of:
   a section of pipe through which heated water flows, said section of pipe having an outlet and an inlet on its surface, means located within said pipe section for inducing the flow of water into said inlet,
   a conduit with one end of said conduit connected to said outlet and the other end of said conduit connected to said inlet,
   a reflecting surface with its back joined in heat conducting relationship to said conduit.

3. The non-fogging mirror structure of claim 1 wherein the means for inducing the flow of water into the outlet are comprised of an ell with an exterior diameter smaller than the interior diameter of said pipe section with the open end of the ell facing upstream to the flow of water through said pipe section.

4. The non-fogging mirror structure of claim 2 wherein the means for inducing the flow of water into the inlet are comprised of an ell with an exterior diameter smaller than the interior diameter of said pipe section with the open end of the ell facing downstream to the flow of water through said pipe section.

5. A non-fogging mirror structure comprised of:
   a section of pipe through which heated water flows, said section of pipe having an outlet and an inlet on its surface,
   means located within said pipe section for inducing the flow of water into said outlet and into said inlet,
   a conduit with one end of the conduit connected to said outlet and the other end connected to said inlet,
   a reflecting surface with its back joined in heat conducting relationship to said conduit.

6. The non-fogging mirror structure of claim 5 wherein the means inducing flow of water into the outlet and into the inlet are comprised of a Tee-shaped member located between said outlet and said inlet with one arm of the Tee projecting over said outlet and the other over said inlet.

7. The non-fogging mirror structure of claim 5 wherein the means inducing flow of water into the outlet are comprised of an ell with an exterior diameter smaller than the interior diameter of said pipe section with the open end of the ell facing upstream to the flow of water through said pipe section and the means inducing the flow of water into the inlet are comprised of an ell with an exterior diameter smaller than the interior diameter of said pipe section with the open end of the ell facing downstream to the flow of water through the pipe section.

8. A non-fogging mirror structure comprised of:
   a section of pipe comprising a shower arm through which heated water flows, said shower arm having an inlet and an outlet on its surface, means located within said shower arm for inducing the flow of water into said outlet and into said inlet, a conduit with one end of the conduit connected to said outlet and the other end connected to said inlet, a reflecting surface with its back joined in heat conducting relationship to said conduit 9. The non-fogging mirror structure of claim 8 wherein the means inducing flow of water into the outlet and into the inlet are comprised of a Tee-shaped member located between said outlet and said inlet with one arm of the Tee projecting over said outlet and the other over said inlet.

10. The non-fogging mirror structure of claim 8 wherein the means inducing flow of water into the outlet are comprised of an ell with an exterior diameter smaller than the interior diameter of said pipe section with the open end of the ell facing upstream to the flow of water through said pipe section and the means inducing the flow of water into the inlet are comprised of an ell with an exterior diameter smaller than the interior diameter of said pipe with the open end of the ell facing downstream to the flow of water through the pipe section.

11. A non-fogging mirror structure comprised of:

a section of pipe through which heated water flows comprised of a pipe section equipped with a female thread for attachment to a shower arm and a male thread for attachment to a shower head, said pipe section having an inlet and an outlet on its surface, means located within said pipe section for inducing the flow of water into said outlet and into said inlet, a conduit with a connection on one end to the outlet and a connection on the other end to the inlet said connections being comprised of an inner tube contained within an outer tube, said inner tube having a smaller cross-sectional area than the interior cross-sectional area of the outer tube, with one tube forming a connection between the outlet and the conduit and the other tube forming a connection between the inlet and the conduit, a reflecting surface with its back joined in heat-conducting relationship to said conduit.

12. The non-fogging mirror structure of claim 11 wherein the means inducing flow of water into the outlet and into the inlet are comprised of a Tee-shaped member located between said outlet and said inlet with one arm of the Tee projecting over said outlet and the other over said inlet.

13. The non-fogging mirror structure of claim 11 wherein the means inducing flow of water into the outlet are comprised of an ell with an exterior diameter smaller than the interior diameter of said pipe section with the open end of the ell facing upstream to the flow of water through said pipe section and the means inducing the flow of water into the inlet are comprised of an ell with an exterior diameter smaller than the interior diameter of said pipe with the open end of the ell facing downstream to the flow of water through the pipe section.

* * * * *